June 6, 1961 N. L. CHALFIN 2,987,575

TWO WAY TELEPHONE HANDSET AMPLIFYING SYSTEM

Filed Nov. 10, 1955 2 Sheets-Sheet 1

Norman L. Chalfin
INVENTOR.

TWO WAY TELEPHONE HANDSET AMPLIFYING SYSTEM

Filed Nov. 10, 1955 2 Sheets-Sheet 2

Norman L. Chalfin
INVENTOR.

2,987,575

TWO WAY TELEPHONE HANDSET AMPLIFYING SYSTEM

Norman L. Chalfin, Culver City, Calif.
(460 San Juan Place, Pasadena, Calif.)
Filed Nov. 10, 1955, Ser. No. 546,151
11 Claims. (Cl. 179—1)

This invention relates to amplifying systems for telephone instruments and more particularly to a telephone amplifying system which provides amplification with a novel induction pickup means for incoming calls and novel acoustic sound re-enforcement means for the outgoing sound.

An amplifier for telephones is frequently desirable where it is important for more than one person to hear the conversation or where it is necessary for the person receiving a phone call to have his hands free for other activity in connection with the phone call.

In the prior art such amplifying systems have been provided where the telephone is laid upon the contoured top of the cabinet of the amplifying system so that by induction from the telephone receiver the received call is picked up and amplified and projected into the room from a loudspeaker. Other systems have placed carbon microphones in a detecting relation to the telephone receiver and the sound thus picked up is finally amplified and projected by a loudspeaker.

An example of the first mentioned prior art device is found in U.S. Patent Number 2,632,811, issued jointly March 24, 1953, to M. L. M. Souget and the present inventor. An example of the second type of prior art device is found in U.S. Patent No. 2,500,264 issued to M. L. M. Souget March 14, 1950.

A problem which still remained in the second type of device, that of severe acoustic feedback, was largely controlled in the induction pickup type of telephone amplifier of the previously-mentioned Patent Number 2,632,811. While much greater room amplification was possible with the above-mentioned telephone amplifier, none of the systems above mentioned or others of the prior art provide suitable amplifying means so that the voice of the party using the telephone amplifier may also be amplified and enable him to speak to the telephone instrument without being required to come close to the transmitter. It has been necessary in the prior art devices to come close to the telephone to speak.

In the present invention a telephone amplifying system is contemplated which both amplifies the incoming signal for projection by a loudspeaker and also provides a novel arrangement for acoustically collecting sound which provides effective amplification of the sound entering the telephone transmitter. I have measured the increase in the outgoing signal in a telephone transmitter using my invention and found that with the party at 10 feet from the phone there was as much as five times more energy generated in the telephone line for the outgoing call as there was when the party was at the same distance from the phone in the absence of the acoustic collecting means of this invention. The collecting means is in the form of an involute exponential horn. Furthermore, the arrangement of the elements of this invention is such that the path of the sound of the incoming call projected by the loudspeaker of the invention is so divergent from the directivity of the sound collecting means for the sound of the outgoing transmission that feedback is entirely eliminated for all practical purposes and the individual using this invention may both receive his call at considerable volume and speak back to the caller at considerable distance from the telephone instrument used in conjunction with the invention.

To use the telephone instrument with this invention it is merely necessary to place the handset of the telephone in the receptacles provided for it in the housing of the invention. An additional feature of the invention is the provision of a pressure switch means and instantaneous amplifier which is rendered immediately operative by the weight of the phone handset on the pressure switch when it is placed in the housing invention for use therewith. The amplifier circuit of this invention has the instantaneous operating feature described in my Patent Number 2,680,786 issued June 8, 1954.

A further additional feature of the invention is a novel intensity (or volume) control means associated with the induction pickup that also serves as an orientation means for the induction pickup.

In the prior art telephone amplifiers it has been necessary either to specifically position the induction pickup or, alternatively, to open the receiver of the telephone instrument in order that the receiver element may be rotated to orient the receiver element to a position of maximum magnetic leakage so that the induction pickup detects maximum signal energy. The means provided in the present invention eliminates the need for pre-orientation.

Accordingly, it is an object of my invention to provide a telephone amplifying system which includes a novel rotatably adjustable induction pickup means and a novel exponential involute horn for acoustically increasing the collecting of sound into the telephone transmitter.

It is a further object of my invention to provide a telephone handset amplifying system in a housing including a movable receptacle for the receiver of the telephone handset and an involute exponential horn as a part thereof, the receptacle and horn being spatially related in the same manner as transmitter and receiver of the telephone handset, the receiver receptacle being adjustable to accommodate handsets in which the spatial separation is different between transmitter and receiver.

It is another object of my invention to provide a telephone handset amplifying system including an instantaneously operative amplifier of the electronic or transistor type which is energizable when the handset is placed upon the system for use with the system.

It is a still further object of my invention to provide in a telephone amplifying system a rotatable induction pickup means whereby the need for orienting the telephone device for maximum pickup is eliminated.

It is yet another object of my invention to provide an involute horn of exponential longitudinal section with its throat and mouth in substantially the same plane in the housing of a telephone amplifying system for the transmitter of the telephone whereby the transmitter sensitivity is substantially increased and will pick up sounds at considerable distance from the phone without appreciable loss in telephone transmission.

These and other objects of the invention will be more clearly understood from the following specification which describes a preferred but not limiting embodiment of my invention. This specification taken together with the claims which follow and the accompanying figures show certain details of this embodiment in accordance with the principles of the invention.

Figure 1:
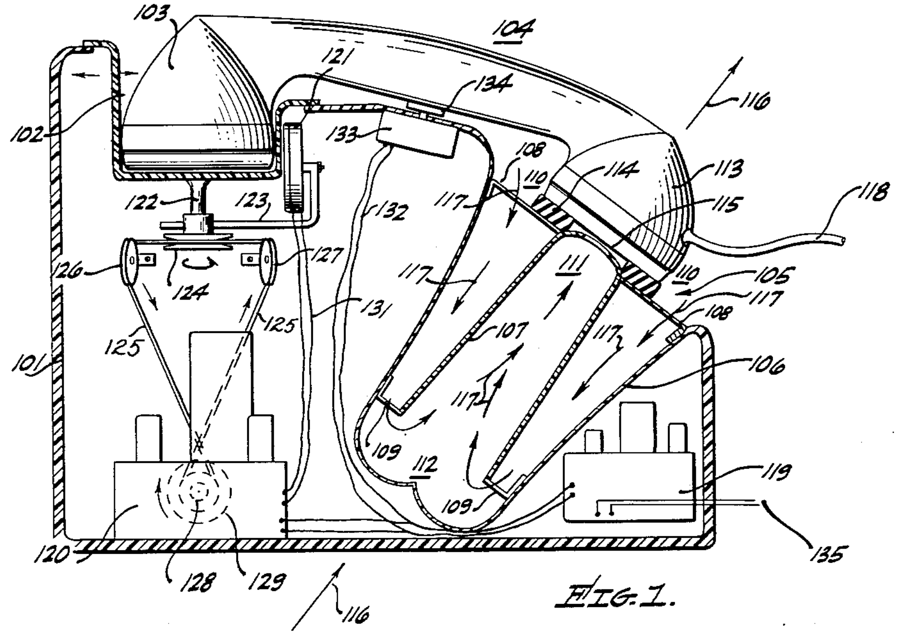
FIG. 1 is a cutaway elevational view of features of my invention.

Referring now to FIG. 1 wherein a cutaway view from the side of my invention is shown, the general shape of the housing 101 may be seen. The housing 101 has a cup or depression 102 in its top surface contoured to receive the receiver 103 of a telephone handset 104. The cup may be a fixed part of the housing top or it may be made adjustably positionable in the direction of the longest dimension of the housing 101 so as to vary the spatial relationship of the cup 102 with respect to horn 105 described later to accommodate phone handsets in which this spatial relationship differs from the most common type of phone illustrated by handset 104. The housing further includes an involute horn 105 that has, as shown in the illustration, one fold-back on itself to form an outer horn 106 and an inner horn 107. The two sections 106, 107 of the horn 105 are joined together by spiders 108 near the mouth 110 and throat 111 and 109 near the trough 112 of the horn 105. The diameter of the mouth 110 of the outer horn 106 is substantially larger than the diameter of the transmitter 113 of the telephone handset 104 which may be set therein. The transmitter 113 is supported on the throat 111 and upper spider 108 of the horn 105. The diameter of throat 111 is just large enough to open upon mouth-piece 115 of transmitter 113. A gasket 114 of appropriately soft materials is provided to seal the transmitter mouthpiece 115 and act as a protective pad for the transmitter 113.

Inner horn 107 and outer horn 106 are concentrically positioned on a common axis within the housing 101 as shown by arrows 116. This axis 116 may be seen to have the same angular relation to the vertical axis of the housing 101 as that of the telephone transmitter 113 with respect to its associated receiver 103. It has been found that this angle has been held the same although the spatial relationship between the receiver and transmitter is different in different phones.

Figure 6:
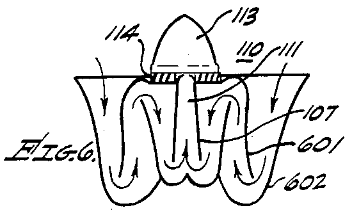
FIG. 6 is a drawing of another form of involute horn for use with the invention.
Figure 5:
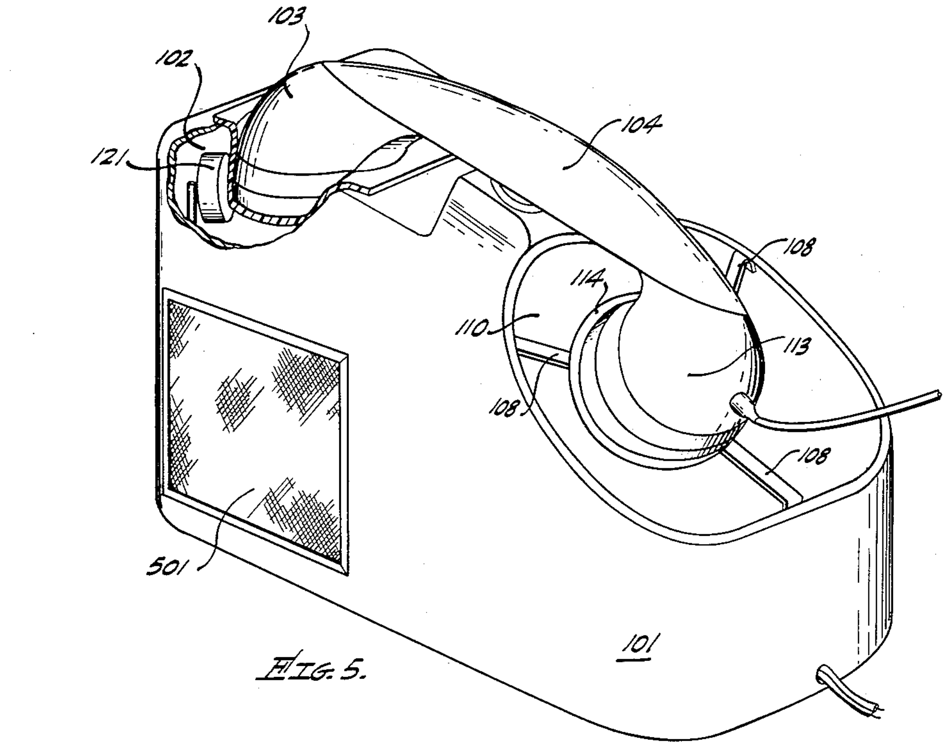
FIG. 5 is an overall partially cutaway perspective view of a housing according to my invention to show some of the internal relationships of the parts thereof.

When the handset 104 is placed in the housing 101 as shown in FIG. 1 and also in FIG. 5 (see following discussion) sound generated outside the housing is picked up and follows arrows 117 into the outer horn 106 from mouth 110 until it reaches the trough 112 where it is deflected into inner horn 107 and to throat 111 where it impinges on mouthpiece 115 of transmitter 113 of the telephone to be transmitted out on the telephone line 118. Horn 105 may have more than one involution or fold-back in order to increase the horn path and also the pickup sensitivity. This is shown in FIG. 6. Within housing 101 there is provided an amplifier 120 which may be a vacuum tube amplifier or a transistor amplifier. While it is possible to provide, according to this invention, an amplifier in either form on a common chassis with its power supply, or to use batteries, which are not shown in the drawings but are certainly contemplated as an obviously possible power source, nevertheless it is preferable for the power supply such as at 119 to be separate from the amplifier and particularly at some distance from the induction pickup 121 to be described below.

The separation between power supply and amplifier is desirable to reduce the likelihood of "hum" pickup by induction coil 121 from A.-C. power fields and sources when used in such fashion.

Within the housing 101 and in close proximity to the inner surface of cup 102, an induction pickup 121 is positioned so as to be rotatable around the periphery of cup 102. Accordingly, when a phone handset is in the instrument, the induction pickup 121 is rotatable about receiver 103. The means for rotating coil 121 shown in FIG. 1 includes a shaft 122 which may be rotatably mounted in the base of cup 102 or may be similarly mounted in the chassis of amplifier 120. It is preferable that shaft 122 be mounted in the cup so that it may move with cup 102 if cup 102 need be adjusted as previously described for different sized handsets. An L-bracket 123 mounted on a pulley 124 is provided to permit attachment of induction pickup coil 121 thereto. Pickup coil 121 is then rotatable on shaft 122 around the inside of cup 102 when pulley 124 is rotated. Rotation of pulley 124 is accomplished by a spring-loaded cord arrangement 125 which is wrapped about pulley 124 and a series of idlers 126 and 127 and a drive shaft and pulley 128 which may be operated by a knob 129 shown dashed in FIG. 1. The spring load for the cord arrangement is not shown but is familiar to those skilled in the radio and electrical arts in radio tuning dial mechanisms. Rotation of knob 129 moves induction coil 121 about the axis of shaft 122 as shown by directions of arrows near drive cord 125. If the cup 102 must be moved, the previously-mentioned spring load takes up any additional tension on cord 125.

As has been briefly noted in the introduction, the rotation of the induction pickup coil 121 about the receiver 103 is necessary to position the coil 121 at a point on receiver 103 where there is a maximum leakage field. A telephone receiver such as 103 has a polar leakage field which is like a two-bladed fan rotor with maxima in the plane through the two blades and minima at a right angle to the plane through the blades. Thus, if the induction coil 121 is positioned along an axis in line with the plane of the maximum leakage field a maximum of induced voltage is generated in the coil and conversely when positioned 90° around from this axis no voltage, or at least very little voltage, is induced. I have found this apparent "null" point to be quite sharp. As further described below this rotatability and the relation thereof to the leakage field of the telephone receiver used in accordance with this invention provides a form of volume control for the telephone amplifying system.

Induction pickup coil 121 is coupled to amplifier 120 by a flexible and shielded conducting cable 131. A pressure responsive power switch 133 is positioned in the top of housing 101 where the weight of telephone handset 104 can depress its button 134 when the handset is placed on the housing 101. Switch 133 is connected to a cable 132 which is the interconnecting power cable between amplifier 120, power supply 119, and the source of A.-C. power. Switch 133 is normally open and closes upon pressure so as to energize the amplifier 120 when the weight of handset 104 is on button 134 to press on and close the contacts of switch 133.

Figure 2:
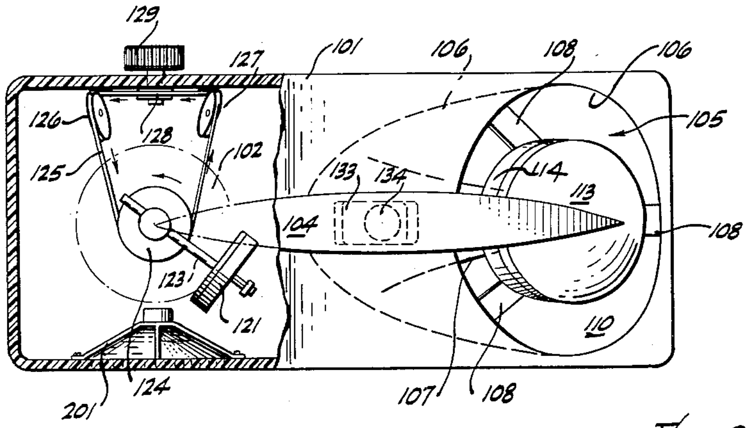
FIG. 2 is a top view of the invention to show its relation to a telephone in use therewith.

In FIG. 2 a top view of the telephone amplifying system of this invention is shown to indicate certain details not otherwise clearly shown in FIG. 1. All reference characters of FIG. 1 are carried through to FIG. 2 for the corresponding elements in the two figures and in each case the corresponding parts bear the same number.

One additional element more clearly shown in FIG. 2 is loudspeaker 201 which is a part of amplifier 120 and is positioned so that the projection of sound from the speaker with respect to the axis of the housing 101 is at least 90° in any direction out from the housing as against the pickup angle or axis 116 of horn 105.

Figure 3:
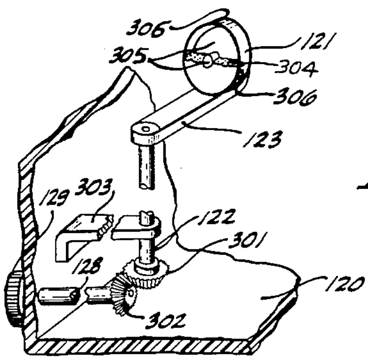
FIG. 3 is a detail of another embodiment of a feature of the invention shown in FIG. 1.

In FIG. 3 a detail of another method of rotating pickup coil 121 is shown. This method incorporates the same L-bracket 123 on shaft 122 as previously described, but a pair of beveled gears 301 and 302 are provided to make possible rotation of coil 121 from the outside of the housing. Additional details of the right angle drive means include the shaft mounting 303.

Also shown in FIG. 3 is a cutaway portion of induction pickup coil 121 to illustrate its construction. The coil 304 of wire is wound inside of a cup of ferromagnetic material such as a ferrite. At 305 the central core and back of the cup is shown while its periphery is at 306.

Figure 4:
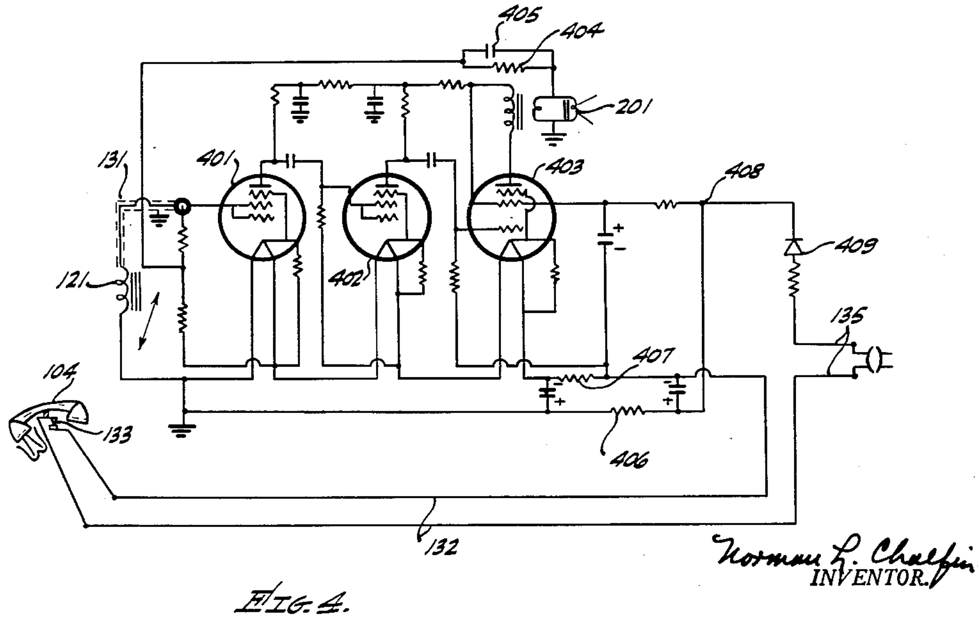
FIG. 4 is a circuit diagram of an amplifier for use with the invention.

In FIG. 4 a form of vacuum tube amplifier is shown which may be used in conjunction with this invention as amplifier 120. The various parts previously described in other figures as FIG. 1 or FIG. 2 are identically numbered in FIG. 4. It is to be noted that filamentary-type tubes 401, 402 and 403 are employed and the current from A.-C. power line 135 is rectified by a semiconductor rectifier to provide both B+ and filament power for the amplifier.

The amplifier as shown in FIG. 4 is of a generally known form and may be modified in many ways for use in conjunction with the invention. Its prime requirements are that the amplifier be instantaneously energizable upon application of the A.-C. power to the telephone amplifying system. I have previously disclosed this type of instantaneously operative amplifier in connection with phonograph and other uses in my Patent No. 2,680,786, above mentioned.

A particular feature of the amplifier of FIG. 4 is the feedback path including resistor 404 and capacitor 405 connected between the output and input. Using capacitor 405 in parallel with resistor 404 increases the feedback at higher frequencies to cancel any tendency toward oscillation of the amplifier itself. The filaments of tubes 401, 402 and 403 are connected in series with a dropping resistor 406 across which is dissipated the difference between the D.-C. supply voltage at 408 and the sum of the filament voltages of tubes 401, 402 and 403 plus the bias voltage drop for tube 403 obtained across resistor 407 also connected in series with the filament string and to the negative side of the D.-C. supply obtained through semiconductor rectifier 409.

In FIG. 5 there is shown an overall perspective view of the telephone amplifying system of this invention as it is used. The parts shown in FIG. 5 are those previously shown in FIGS. 1 and 2 and are called out with the same reference characters. The cross-hatched area 501 covers the speaker 201 previously described to allow sound through the housing from the speaker.

By referring to the figures in general it is possible to follow the operation of the telephone amplifying system of this invention as described below:

When it is desired for an example to engage in a telephone conversation where a third person or group should hear and be able to talk back to the other (remote) telephone party, the telephone handset 104 is placed upon housing 101 so that receiver 103 is centered in cup 102, and transmitter 113 is centered on pressure pad 114 in the center of exponential involute horn 105. In this position handset 104 presses on switch button 134 to close switch 133 and energize instantaneously the transistor or vacuum tube amplifier such as 120 through its power supply 119. Signal energy of an incoming call on line 118 is present in receiver 103 and through the wall of cup 102 (which should be a non-magnetic material, perhaps impregnated glass fiber, or aluminum or the like), and a magnetic leakage field which varies as the incoming telephone signal varies is generated. This field induces a corresponding voltage variation in induction pickup coil 121 which is rotated by control 129 for the desired degree of loudness to a point around the inside periphery of cup 102. The voltage induced in induction pickup 121 is carried to amplifier 120 and amplified so as to be transmitted by loudspeaker 201 through the housing opening 501 at high volume and can be heard by all. Distant sounds of the voices of persons in the aforementioned exemplary group, speaking in the room with the telephone amplifying system of this invention, are picked up in mouth 110 of horn 105, carried down outer horn 106 to trough 112 and into inner horn 107 to mouthpiece 115 of telephone transmitter 113 through throat 111 of the inner horn 107. The volume of sound appearing across the large opening 110 of horn 106 is compressed into smaller opening 111 of horn 107 to excite the diaphragm of transmitter 113 with greater pressure than the transmitter would receive in open air. I have found by actual measurement that this increase gave a signal voltage in the telephone line five times greater than in free air when the source of sound was ten feet from the phone. I believe that the inverse square law applies here and that at greater distances a lesser gain, but gain, nevertheless, is experienced, while closer to the phone greater gain is experienced than that measured in the experiment related above.

It will be evident to one skilled in the art, after following my invention as described herein, that there are other ways, in detail, to implement my invention without departing from the spirit and scope thereof as defined in the claims which follow.

What I claim as new is:

1. An audio amplifying system for a handset telephone having a transmitter and a receiver spaced apart from one another, said system comprising: an instantaneously energizable audio amplifier having an input circuit and an output circuit; an induction pickup electrically connected to the input circuit of said amplifier; a loudspeaker coupled to the output circuit of said amplifier; a frequency sensitive degenerative feedback circuit connected between said input circuit and said output circuit of said amplifier; a housing means adapted to contain said induction pickup, said amplifier, and said loudspeaker, said housing means having a spaced pair of receptacles in the top surface thereof to support the handset, and an opening in one side thereof to provide an output sound path for said loudspeaker; one of said receptacles being cup-shaped and adapted to contain and support the receiver of the telephone handset; the other of said receptacles having an involute horn therein adapted to support and contain the transmitter of the telephone handset and to direct sound thereinto said transmitter being made thereby more sensitive to sound to permit talking into the telephone from a substantial distance therefrom; and a manually operable rotatable device mechanically coupled to said induction pickup, and positionable within said housing so as to permit rotation of said induction pickup around the periphery of said cup-shaped receptacle, whereby signals in the magnetic leakage field of the telephone receiver are induced in said induction pickup, amplified and transmitted by said loudspeaker.

2. An audio amplifying system for a handset telephone having a transmitter and a receiver spaced apart from one another, said system comprising: audio amplifier means having an output transducer; rotatably positionable induction pickup means connected to said amplifier means; housing means adapted to contain said induction pickup means and said amplifier, said housing means having a spaced pair of receptacles in the uppermost surface thereof to support the handset; one of said receptacles being cup-shaped and adapted to fit about and support the receiver of the telephone handset; the other of said receptacles having a sound reenforcing folded horn therein adapted to support and fit about the transmitter of the telephone handset and to direct sound thereinto the sensitivity of said transmitter of said telephone is reinforced to permit talking into the telephone at a substantial distance therefrom; and a manual control device mechanically coupled to said induction pickup so that movement of said manual control device rotates said induction pickup around the periphery of said cup-shaped receptacle to a point of maximum magnetic leakage field of said receiver, whereby signals in the magnetic leakage field of the telephone receiver are induced in said induction pickup, amplified and projected by said transducer.

3. An audio amplifying system for a handset telephone having a transmitter and a receiver spaced apart from one another, said system comprising the combination of an audio amplifier; a rotatably positionable induction pickup electrically connected to said amplifier; a sound transducer connected to said amplifier; housing means adapted to contain said induction pickup, said amplifier and said transducer, said housing means having a spaced pair of receptacles in the uppermost surface thereof to support the handset, one of said receptacles being cup-shaped and adapted to support the receiver of the telephone handset; the other of said receptacles having an involute horn adapted to support and cotnain the transmitter of the telephone handset and to direct sound thereinto; and a manual control device mechanically coupled to said induction pickup for positioning said induction pickup with respect to said receiver supported in said cup-shaped receptacle.

4. In an amplifying system for use with handset telephones having a transmitter and a receiver spaced apart from one another, the combination of: a housing for containing the system and supporting the telephone handset, said housing having spaced receptacles for the receiver and transmitter thereof, respectively; an amplifier; an induction pickup electrically connected to said amplifier and mechanically positionable at will; means connected with said induction pickup for rotating said pickup with respect to the receiver of said handset in its respective receptacle to a point of maximum magnetic leakage field of said receiver; and an involute horn incorporated in the other of said receptacles of said housing for reinforcing and directing sound into the transmitter of said telephone handset.

5. In an amplifying system for handset telephones having spaced apart receiver and transmitter; a movably positionable induction pickup means adapted for cooperation with said receiver to pick up the magnetic signal leakage field therefrom; an involute horn adapted for cooperation with said transmitter to reinforce and direct sound thereinto; and a housing having receptacles therein adapted to hold the telephone handset receiver and transmitter respectively in cooperative relation to said induction pickup and said involute horn respectively.

6. In an amplifying system for handset telephones having spaced apart receiver and transmitter a folded horn having its mouth and throat in substantially the same plane, said horn being positioned to cooperate with the transmitter of the handset for reinforcing and directing sound into said transmitter.

7. In an amplifying system for handset telephones having a receiver and a transmitter spaced apart from one another, an induction pickup mechanically connected with a fully rotatable drive control device adapted for continuously movable positioning of said induction pickup around said receiver of said handset 8. In an amplifying system for handset telephones having a receiver and a transmitter spaced apart from one another, a housing having spaced receptacles in the uppermost surface thereof one of which is adapted for engaging the receiver of the handset, the other of which is in the form of an involute horn and adapted to cooperate with the transmitter of said handset.

9. In an amplifier system for handset telephones having a receiver and a transmitter spaced apart from one another, a folded exponential horn having a mouth and a throat in substantially the same plane and being adapted for cooperation with the transmitter of said handset whereby said mouth of said horn surrounds the transmitter and the throat thereof is applied to the transmitter mouthpiece whereby sound energy arriving around the area outside the transmitter is collected in said mouth reinforced and directed through said folded exponential horn to the mouthpiece of the transmitter.

10. The involute exponential horn defined in claim 9 wherein there are an odd numbered plurality of concentric folds back on one another in the interior of the horn, and the throat of the horn and the ultimate mouth of the horn are in substantially the same plane, providing a long path exponentially decreasing in diameter from said mouth to said throat of said horn, whereby sound energy appearing in the area of said mouth of said horn is transmitted through said horn and is directed out of the throat area of said horn into said telephone transmitter substantially increased in magnitude over that received in said mouth area.

11. A telephone amplifying system for handset telephone instruments having a receiver and a transmitter spaced apart from one another comprising: an instantaneously energizable loudspeaker-amplifier; normally open pressure switch means connected with said loudspeaker-amplifier to energize the amplifier in response to pressure thereon; an induction pickup electrically connected to said loudspeaker-amplifier; a rotatable means connected with said pickup to move the pickup in a circular path; a housing, said housing having a top surface and at least supporting sides, said top surface having a receptacle adapted to contain the receiver of the handset telephone and to hold it in cooperative relation to said induction pickup whereby the pickup may be moved in a circular path about the receiver; and an exponential involutely folded horn in said top surface adapted for cooperation with the transmitter of the telephone handset and for collecting and receiving sound and directing the sound into the transmitter; said pressure switch being mounted in the top surface of said housing in engagement relation to the handset so that when the handset is placed on said top surface of said housing and the receiver and transmitter are in cooperation with the receptacle and folded horn respectively, the amplifier is instantaneously energized to amplify telephone signals in the magnetic leakage field of the receiver induced in said induction coil, and said horn is in position to direct and reinforce sound into the transmitter whereby the telephone subscriber may use the telephone at a distance from its location without having to hold the telephone instrument.

References Cited in the file of this patent

UNITED STATES PATENTS

| | | |
|---|---|---|
| 2,501,212 | Cunow | Mar. 21, 1950 |
| 2,639,329 | Ferrier | May 19, 1953 |
| 2,657,265 | Branson et al. | Oct. 27, 1953 |

FOREIGN PATENTS

| | | |
|---|---|---|
| 478,682 | Italy | July 21, 1950 |
| 678,380 | Great Britain | Sept. 3, 1952 |